United States Patent
Abdul Jabbar et al.

(10) Patent No.: US 12,148,931 B2
(45) Date of Patent: Nov. 19, 2024

(54) LOW RESISTANCE CATHODE FOR SOLID-STATE BATTERY

(71) Applicant: Nissan North America, Inc., Franklin, TN (US)

(72) Inventors: Mohammed Hussain Abdul Jabbar, Farmington Hills, MI (US); Alolika Mukhopadhyay, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 185 days.

(21) Appl. No.: 17/203,602

(22) Filed: Mar. 16, 2021

(65) Prior Publication Data

US 2022/0302457 A1 Sep. 22, 2022

(51) Int. Cl.
*H01M 4/62* (2006.01)
*H01M 4/02* (2006.01)
*H01M 4/13* (2010.01)
*H01M 4/36* (2006.01)
*H01M 10/0525* (2010.01)

(52) U.S. Cl.
CPC ............. *H01M 4/625* (2013.01); *H01M 4/13* (2013.01); *H01M 4/366* (2013.01); *H01M 4/62* (2013.01); *H01M 10/0525* (2013.01); *H01M 2004/021* (2013.01); *H01M 2004/028* (2013.01)

(58) Field of Classification Search
CPC ........ H01M 4/625; H01M 4/13; H01M 4/366; H01M 4/62; H01M 10/0525; H01M 2004/021; H01M 2004/028; Y02E 60/10
See application file for complete search history.

(56) References Cited

U.S. PATENT DOCUMENTS

2002/0018934 A1* 2/2002 Majima ................. H01M 4/133
                                                    423/448
2010/0261061 A1* 10/2010 Yuasa ................... H01M 4/625
                                                    252/182.1

(Continued)

FOREIGN PATENT DOCUMENTS

CN    1253390 A  *  5/2000  ........ H01M 10/0431
CN    1322608 C      6/2007

(Continued)

OTHER PUBLICATIONS

Acetylene black-embedded LiMn0.8Fe0.2PO4/C composite as cathodeor lithium ion battery B.Z. Li a, Y. Wang a, L. Xue a, X.P. Li a, b, c, W.S. Li a (Year: 2013).*

(Continued)

*Primary Examiner* — Anca Eoff
(74) *Attorney, Agent, or Firm* — Global IP Counselors, LLP

(57) ABSTRACT

A cathode is provided that includes a lithium-ion conductive material, at least one carbon support structure at least partially embedded within the lithium-ion conductive material, and cathode active material particles. The cathode active material particles are provided within and on a surface of each of the at least one carbon support structure. A solid-state battery is also provided that includes the cathode in which cathode active materials are provided within and on a surface of each of the at least one carbon support structure, and the at least one carbon support structure is at least partially embedded within the lithium-ion conductive material.

21 Claims, 6 Drawing Sheets

(56) References Cited

U.S. PATENT DOCUMENTS

| | | | |
|---|---|---|---|
| 2011/0091773 A1 | 4/2011 | Wei | |
| 2011/0260100 A1* | 10/2011 | Trukhan | H01M 10/052 |
| | | | 252/182.1 |
| 2012/0295161 A1* | 11/2012 | Wang | H01M 4/806 |
| | | | 977/948 |
| 2015/0024256 A1 | 1/2015 | Anandan et al. | |
| 2015/0180036 A1* | 6/2015 | Takebayashi | H01M 4/525 |
| | | | 429/321 |
| 2016/0060115 A1* | 3/2016 | La Forest | C04B 35/62886 |
| | | | 423/445 R |
| 2019/0267666 A1 | 8/2019 | Shin | |
| 2019/0334203 A1* | 10/2019 | Linde | B60L 50/64 |
| 2020/0251742 A1* | 8/2020 | Anandan | H01M 10/054 |
| 2020/0313161 A1* | 10/2020 | Isojima | H01M 4/133 |
| 2021/0057751 A1* | 2/2021 | Lanning | H01M 4/663 |

FOREIGN PATENT DOCUMENTS

| | | | |
|---|---|---|---|
| CN | 102576878 A | | 7/2012 |
| CN | 109935896 A | | 6/2019 |
| DE | 102014212951 A1 | | 1/2015 |
| JP | 2012028225 A | * | 2/2012 |
| JP | 2019220250 A | * | 12/2019 |
| WO | WO-2020041775 A1 | * | 2/2020 ........... C04B 35/486 |

OTHER PUBLICATIONS

English translation of JP-2012028225-A, Ueda.*
English translation JP-2019220250-A, Kobayashi.*
Wikipedia "poous medium" (Year: 2023).*
Machine translation of CN 1253390A, published on May 17, 2000 (Year: 2000).*
Moyer, K., Boucherbil, N..A., Zohair, M., Eaves-Rathert, J., Pint, C. L.—Polymer reinforced carbon fiber interfaces for high energy density structural lithium-ion batteries, Sustainable Energy $ Fuels, 2020, 4, pp. 2661-2668 (Year: 2020).*
Eongyu Yi et al., "All-Solid-State Batteries Using Rationally Designed Garnet Electrolyte Frameworks", ACS Appl. Energy Mater. 2020, 3, pp. 170-175.
Heather Cavers et al., "Temperature-Dependent Vapor Infiltration of Sulfur into Highly Porous Hierarchical Three-Dimensional Conductive Carbon Networks for Lithium Ion Battery Applications", ACS Omega 2020, 5, pp. 28196-28203.
Min-Ju Kim et al., "Facile fabrication of solution-processed solid-electrolytes for high-energy-density all-solid-state- batteries by enhanced interfacial contact", Scientific Reports, 2020, 10:11923, pp. 1-11.

* cited by examiner

LOW RESISTANCE CATHODE FOR SOLID-STATE BATTERY

BACKGROUND

Field of the Invention

The present invention generally relates to a low resistance cathode for a solid-state battery, and a solid-state battery including the low resistance cathode. The cathode includes a lithium-ion conductive material, a three-dimensional carbon support structure at least partially embedded within the lithium-ion conductive material, and cathode active material particles. The cathode active material particles are provided both within and on a surface of the three-dimensional carbon support structure.

Background Information

Batteries that include lithium metal anodes are desirable because they have a high energy density and, thus, can generate a large amount of power with a relatively thin anode, thus permitting a reduction in the size of the battery as compared with other conventional anodes made of carbon or silicon. Conventional batteries using lithium metal anodes include cathodes formed of complex oxides such as lithium nickel manganese cobalt oxide ($LiNiMnCoO_2$, also commonly referred to as "NMC"). However, there are several drawbacks with lithium metal anodes. For example, the performance of lithium metal anodes is limited by current density as such anodes are prone to excessive dendritic growth and accumulation of dead lithium resulting in severe volume expansion of lithium metal anodes in the battery.

In order to improve the safety and energy storage capacity of batteries using liquid electrolytes, solid-state batteries have been developed that use a solid or polymer electrolyte to conduct lithium ions between the anode and cathode. Solid-state batteries allow for a much smaller battery size due to their improved energy density. However, solid-state batteries have an increased interfacial resistance between the solid electrolyte and the cathode due to the poor contact between the cathode active material and the solid electrolyte and the increased thickness of the electrolyte. Also, low ionic conductivity of the cathode increases the internal resistance of the cells.

It has been known to provide a solid-state battery having a cathode in which a catalytically active material such as NMC is mixed with both an electron conducting material such as carbon and a lithium-ion conductive material such as a sulfide electrolyte. Conventionally, infiltration has been used to decrease the resistance and improve the energy density of the solid-state battery by increasing the loading of the cathode active material. In such a case, the cathode is formed by infiltrating a porous solid electrolyte material with carbon and NMC. However, these batteries have a high resistance and a limited effect on battery performance.

Therefore, further improvement is needed to sufficiently reduce the internal resistance and overall performance of the solid-state battery. In particular, it is desirable to increase the diffusion of lithium ions between the anode and cathode and decrease the interfacial resistance between the cathode and the electrolyte.

SUMMARY

It has been discovered that the diffusion of lithium ions between the anode and cathode can be improved using a cathode in which the cathode active material particles are sufficiently infiltrated into a lithium-ion conductive material such as a solid electrolyte.

In particular, it has been discovered that a cathode in which cathode active material particles are either infiltrated into a three-dimensional carbon support structure embedded in a lithium-ion conductive material or are directly infiltrated into a porous lithium-ion conductive scaffold can be incorporated into the battery to improve the conduction of lithium ions between the anode and cathode and decrease the internal resistance of the battery. Therefore, it is desirable to provide a solid electrolyte battery that includes such a cathode.

In view of the state of the known technology, one aspect of the present disclosure is to provide a cathode. The cathode includes a lithium-ion conductive material, at least one carbon support structure at least partially embedded within the lithium-ion conductive material, and cathode active material particles. The cathode active material particles are provided within and on a surface of each of the carbon support structures.

Another aspect of the present disclosure is to provide a battery including a low resistance cathode. The battery includes a cathode, an anode, and a lithium-ion conductive solid electrolyte disposed between the cathode and the anode. The cathode comprises a lithium-ion conductive material, at least one carbon support structure at least partially embedded within the lithium-ion conductive material, and cathode active material particles provided within and on a surface of each of the carbon support structures. By providing the cathode active material particles both within and on a surface of the carbon support structures, the cathode active material particles are always in contact with both the conductive carbon support structure and the lithium-ion conductive material, thereby improving both the lithium-ion conductivity and electronic conductivity and decreasing the internal resistance of the battery.

A further aspect of the present disclosure is to provide a battery including a cathode, an anode and a porous lithium-ion conductive solid electrolyte disposed between the cathode and the anode. The porous lithium-ion conductive solid electrolyte comprises pillars spaced apart from each other to form a porous solid electrolyte scaffold, and the cathode includes cathode active material particles provided between the pillars of the porous solid electrolyte scaffold. By providing the pillars on the porous solid electrolyte scaffold, the infiltration of cathode active material particles into the lithium-ion conductive solid electrolyte can be improved, thereby decreasing the resistance of the battery and improving the conduction of lithium ions between the anode and cathode.

BRIEF DESCRIPTION OF THE DRAWINGS

Referring now to the attached drawings which form a part of this original disclosure:

FIG. 2b shows SEM images of the cathode of FIG. 2a;

FIG. 2c is a schematic view of the cathode of FIG. 2a;

DETAILED DESCRIPTION OF EMBODIMENTS4A

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
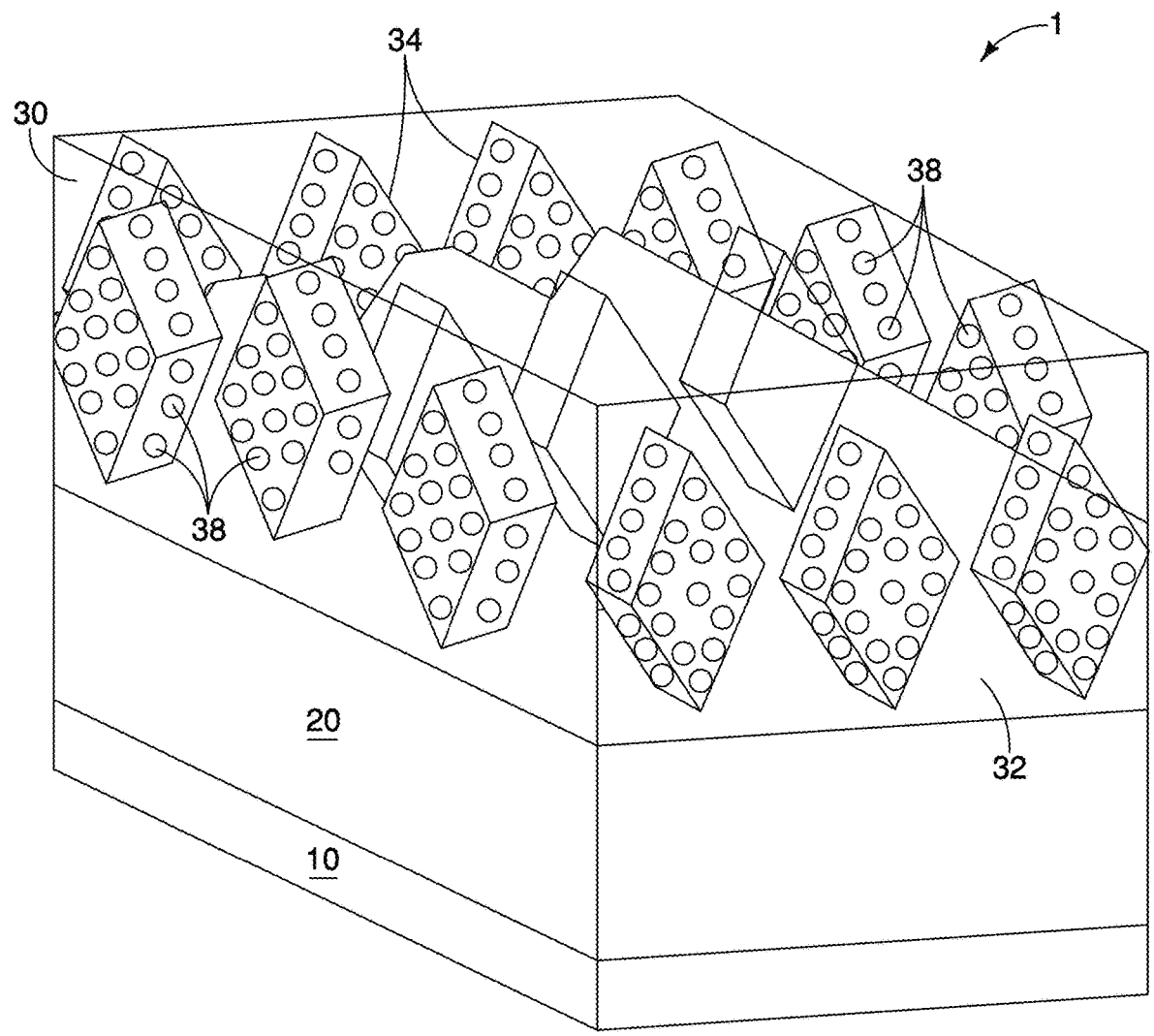
FIG. 1 is a perspective view of a solid electrolyte battery according to one embodiment.

Referring initially to FIG. 1, a solid-state battery 1 is illustrated that includes an anode 10, an electrolyte 20, and a cathode 30 in accordance with a first embodiment. The solid-state battery 1 can be incorporated in a vehicle, a mobile device, a laptop computer or other suitable personal electronic device.

The anode 10 includes an anode active material. The anode 10 may also include a binder and an additive. The anode active material is any suitable anode active material that is compatible with a solid electrolyte. For example, the anode active material may be lithium metal or a lithium alloy. The conventional graphite or graphite silicon composite anodes can also be used as the anode 10. The anode 10 includes approximately 90-95 percent by weight of the anode active material and five to ten percent by weight of the additive plus the binder. For example, the anode 10 may include approximately 95.0 percent by weight of the anode active material, 2.5 percent by weight of the additive and 2.5 percent by weight of the binder.

The anode 10 may be formed by mixing the anode active material, the additive and the binder with a suitable solvent, such as N-methyl pyrrolidone (NMP). The weight ratio of the solvent to the sum of the anode active material, the additive and the binder may be approximately 2:1.

The electrolyte 20 is a solid electrolyte. The solid electrolyte can be any suitable lithium-ion conductive solid electrolyte. For example, the solid electrolyte can be a sulfide solid electrolyte, an oxide solid electrolyte or a solid polymer electrolyte that includes a polymer having ion transport properties. For example, the solid polymer electrolyte can be a lithium salt dissolved in a conductive polymer matrix such that there is an equimolar amount of the conductive polymer matrix and the lithium salt(s). The lithium salt may be lithium trifluorosulfonylimide (LiTFSI), lithium bis(fluorosulfonyl)imide (LiFSI), lithium hexafluorophosphate (LiPF$_6$), lithium tetrafluoroborate (LiBF$_4$), lithium bis(oxalato)borate (LiBOB), or lithium difluorooxalato borate (LiDFOB). The polymer matrix may be any suitable polymer matrix. For example, the polymer matrix may include a polyalkyleneoxide such as polyethylene oxide (PEO). The polymer matrix may also include a siloxane.

When a sulfide solid electrolyte is used as the electrolyte 20 and the anode 10 includes lithium metal, a protective layer (not shown) may be provided between the electrolyte 20 and the anode 10.

The cathode 30 includes a lithium-ion conductive material 32, three-dimensional carbon matrices 34, and cathode active material particles 38. The lithium-ion conductive material 32 is any suitable lithium-ion conductive material. For example, the lithium-ion conductive material 32 is the same solid electrolyte material as the electrolyte 20. Preferably, the lithium-ion conductive material 32 is a sulfide solid electrolyte or an oxide solid electrolyte.

The three-dimensional carbon matrices 34 are diamond-shaped support structures that are formed of a suitable conductive carbon material and are fully embedded within the lithium-ion conductive material 32 such that the carbon matrices 34 are each completely covered by the lithium-ion conductive material 32. However, it should be understood that any suitable shape may be used to form the three-dimensional carbon matrices 34. For example, in an alternative embodiment, the three-dimensional carbon matrices 34 may have a dumbbell shape or an arrow shape. The three-dimensional carbon matrices 34 may also have irregular or dissimilar shapes from each other.

The three-dimensional carbon matrices 34 are spaced apart at approximately equal distances and are uniformly distributed within the lithium-ion conductive material 32. However, it should be understood that the three-dimensional carbon matrices 34 may be non-uniformly distributed within the lithium-ion conductive material.

Furthermore, although the three-dimensional carbon matrices 34 are shown in FIG. 1 as being fully embedded within the lithium-ion conductive material 32, it should be understood that the three-dimensional carbon matrices 34 may be only partially embedded within the lithium-ion conductive material 32 such that a portion of the three-dimensional carbon matrices 34 and/or the cathode active material particle 38 are not embedded within the lithium-ion conductive material 32.

The three-dimensional carbon matrices 34 have a length of 5-30 μm and have interconnected holes or voids that contain the cathode active material particles 38. The three-dimensional carbon matrices 34 may be formed via hydrothermal synthesis or any other suitable method that generates a three-dimensional carbon structure having a length of 5-30 μm and voids of a sufficient size (15 nm to 5 μm) to hold cathode active material particles 38.

The cathode active material particles 38 are any suitable cathode active material particles that can be used in a solid-state battery. For example, the cathode active material particles 38 may be formed of any suitable lithium oxide-based cathode active material. For example, the cathode active material particles may be NMC particles, lithium cobalt oxide particles, lithium phosphate particles, lithium iron phosphate particles or a mixture thereof. The cathode active material particles 38 have a diameter of approximately 15 nm to 5 μm. The cathode active materials can be single crystal or polycrystalline.

The cathode 30 may also include an additive (such as sacrificial cathode materials that acts as an additional source of lithium ions) and/or a binder. The additive and the binder may be included within the three-dimensional carbon matrices 34 or within the lithium-ion conductive material 32. The cathode 30 includes at least 80 percent by weight of the cathode active material particles 38. The cathode also includes 5-15 percent by weight of the lithium-ion conductive material 32, preferably 10-15 percent by weight of the lithium-ion conductive material 32, 2-5 percent by weight of the three-dimensional carbon matrices 34, and up to three percent by weight of the additive plus the binder. For example, the cathode 30 may include approximately two percent by weight of the additive and approximately three percent by weight of the binder. The weight percentage values described above are relative to a total weight of the cathode active material particles 38, the lithium-ion conductive material 32, the three-dimensional carbon matrices 34, the additive and the binder.

The binder may be any suitable electrode binder material. For example, the binder may include polyvinylidene fluoride, styrene-butadiene rubber, a cellulose material or any combination thereof. The additive may be any suitable sacrificial electrode additive, such as a material that acts as an additional source of lithium ion. The anode 10 may also include any suitable additive or binder.

The cathode 30 may be formed by mixing the three-dimensional carbon matrices 34 with the lithium-ion conductive material 32 to form a cathode mixture, and then adding the cathode active material particles 38. For example, the cathode active material particles 38 may be added to the cathode mixture as dry powder or nanoparticles, or the cathode active material particles 38 may be dissolved in a solvent such as ethanol and/or water and then added to the cathode mixture.

The cathode 30 may also include a current collector (not shown) formed on top of the lithium-ion conductive material 32, and the anode 10 may also optionally include a current collector (not shown).

Figure 2A:
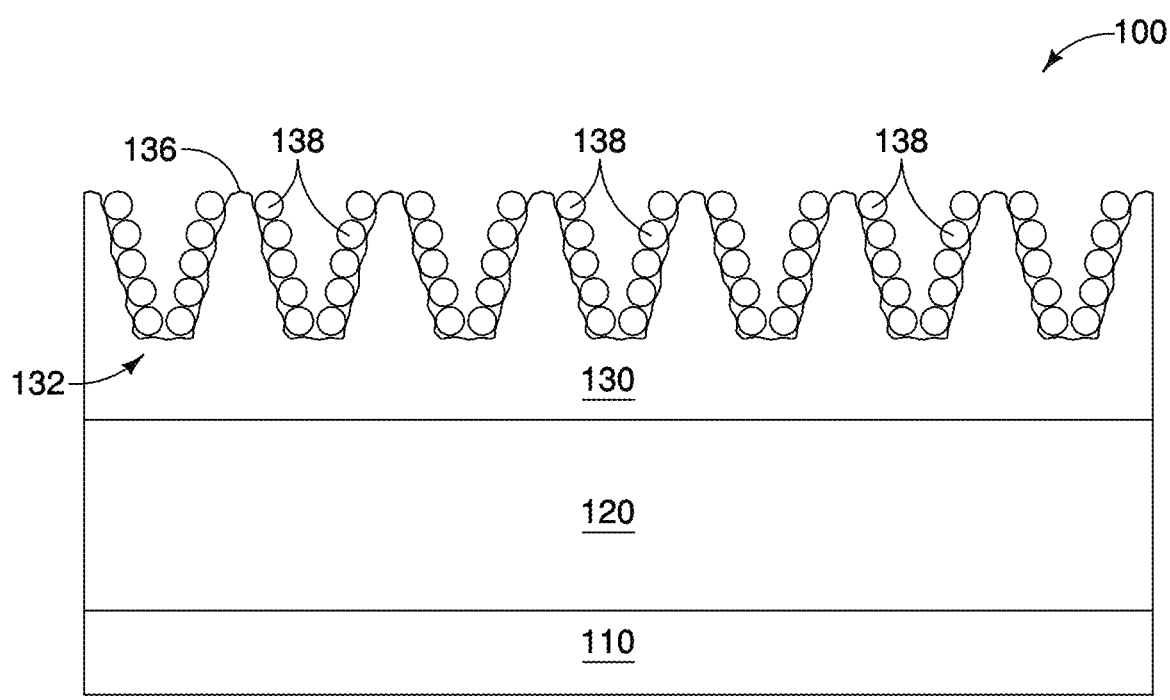
FIG. 2a is a cross-sectional view of a solid electrolyte battery according to an embodiment.

FIG. 2a shows a solid-state battery 100 that includes an anode 110, an electrolyte 120, and a cathode 130 in accordance with a second embodiment. Like the solid-state battery 1 of the first embodiment, the solid-state battery 100 can be incorporated in a vehicle, a mobile device, a laptop computer or other suitable personal electronic devices.

The anode 110 includes an anode active material. The anode 110 may also include a binder and an additive. The anode active material is any suitable anode active material that is compatible with a solid electrolyte. For example, the anode active material may be lithium metal or a lithium alloy. As in the first embodiment, the anode 110 includes approximately 90-95 percent by weight of the anode active material and five to ten percent by weight of the additive plus the binder. For example, the anode 110 may include approximately 95.0 percent by weight of the anode active material, 2.5 percent by weight of the additive and 2.5 percent by weight of the binder.

The anode 110 may be formed by mixing the anode active material, the additive and the binder with a suitable solvent, such as N-methyl pyrrolidone (NMP). The weight ratio of the solvent to the sum of the anode active material, the additive and the binder may be approximately 2:1.

The electrolyte 120 is a solid electrolyte. The solid electrolyte can be any suitable lithium-ion conductive solid electrolyte. For example, the solid electrolyte can be a sulfide solid electrolyte, an oxide solid electrolyte or a solid polymer electrolyte that includes a polymer having ion transport properties. For example, the solid polymer electrolyte can be a lithium salt dissolved in a conductive polymer matrix such that there is an equimolar amount of the conductive polymer matrix and the lithium salt(s). The lithium salt may be lithium trifluorosulfonylimide (LiTFSI), lithium bis(fluorosulfonyl)imide (LiFSI), lithium hexafluorophosphate ($LiPF_6$), lithium tetrafluoroborate ($LiBF_4$), lithium bis(oxalato)borate (LiBOB), or lithium difluorooxalato borate (LiDFOB). The polymer matrix may be any suitable polymer matrix. For example, the polymer matrix may include a polyalkyleneoxide such as polyethylene oxide (PEO). The polymer matrix may also include a siloxane.

When a sulfide solid electrolyte is used as the electrolyte 120 and the anode 110 includes lithium metal, a protective layer (not shown) may be provided between the electrolyte 120 and the anode 110.

The cathode 130 includes a lithium-ion conductive material 132, pillars 136, and cathode active material particles 138. The lithium-ion conductive material 132 is any suitable lithium-ion conductive material. Preferably, the lithium-ion conductive material 132 is the same solid electrolyte material as the electrolyte 120. The lithium-ion conductive material 132 is preferably a sulfide solid electrolyte or an oxide solid electrolyte.

Figure 2B:
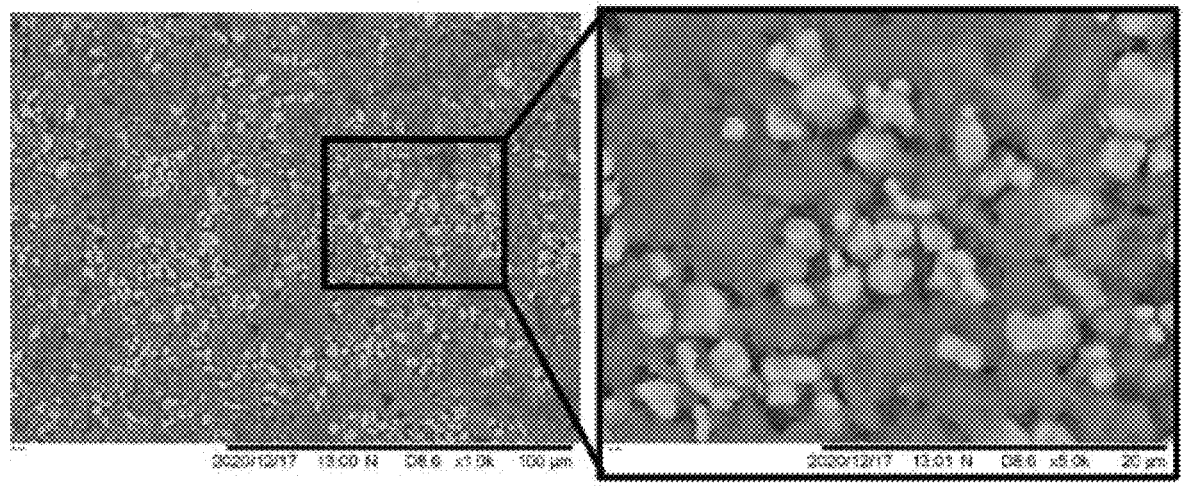

The cathode 130 is a porous scaffold structure formed of lithium-ion conductive material 132 that includes nucleation sites on the pillars 136 for the cathode active material particles 138. As shown in the SEM images in FIG. 2b, the cathode active material particles 138 are the bright spots in the images, and the darker gray spots are the porous scaffold structure of the cathode 130. The black spots in the SEM images of FIG. 2b represent pores or holes in the porous scaffold structure of cathode 130.

The porous scaffold structure of cathode 130 may be formed by freeze drying the lithium-ion conductive material 132. By freeze drying the lithium-ion conductive material 132, for example at −50° C., and optimizing the cooling temperature during freeze drying, the number of nucleation sites on the pillars 136 may be increased to allow an increased loading of cathode active material particles 138 on the pillars 136.

Figure 2C:
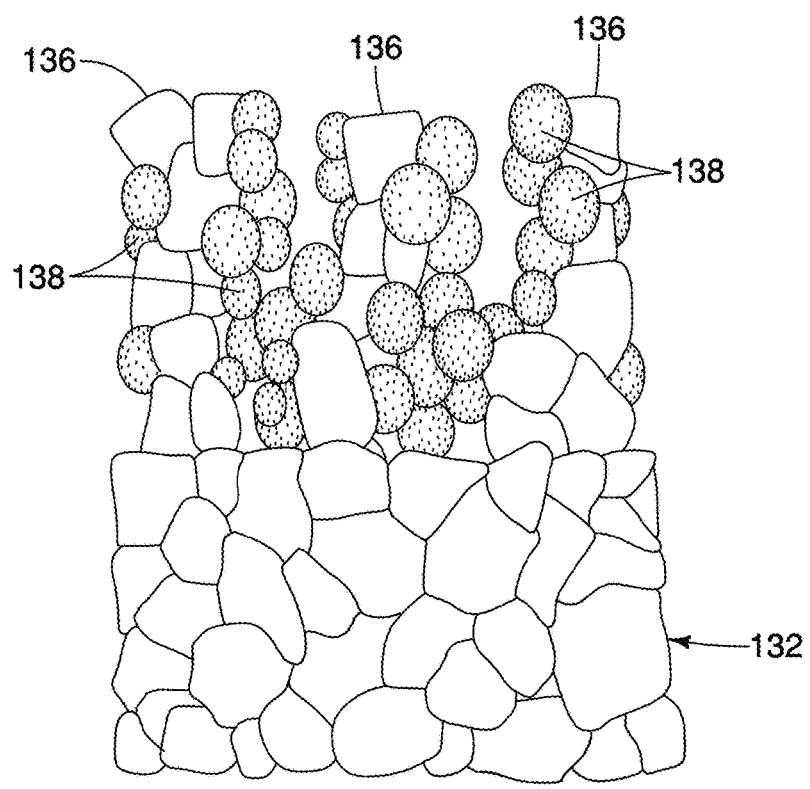

As shown in detail in FIG. 2c, the pillars 136 are spaced apart on the porous scaffold of lithium-ion conductive material 132 with the cathode active material particles 138 provided between the pillars 136. The pillars 136 are spaced apart from each other at approximately equal distances of 5-10 μm on the porous scaffold. However, it should be understood that the pillars 136 may be non-uniformly spaced apart from each other or have non-uniform shapes, as long as the gap between the pillars 136 is approximately 5-10 μm.

The cathode active material particles 138 are any suitable cathode active material particles that can be used in a solid-state battery. For example, as in the first embodiment, the cathode active material particles 138 may be formed of any suitable lithium oxide-based cathode active material. For example, the cathode active material particles may be NMC particles, lithium cobalt oxide particles, lithium phosphate particles, lithium iron phosphate particles or a mixture thereof. The cathode active material particles 138 have a size/diameter of approximately 15 nm to 5 μm.

The cathode 130 may also include an additive and/or a binder. The additive and the binder may be included between the pillars 136 or within the lithium-ion conductive material 132. The cathode 130 includes at least 80 percent by weight of the cathode active material particles 138. The cathode also includes 5-15 percent by weight of the lithium-ion conductive material 132, preferably 10-15 percent by weight of the lithium-ion conductive material 132, and up to five percent by weight of the additive plus the binder. For example, the cathode 130 may include approximately two percent by weight of the additive and approximately three percent by weight of the binder. The weight percentage values described above are relative to a total weight of the cathode active material particles 138, the lithium-ion conductive material 132, the additive and the binder.

The binder may be any suitable electrode binder material. For example, the binder may include polyvinylidene fluoride, styrene-butadiene rubber, a cellulose material or any combination thereof. The additive may be any suitable electrode additive, such as a carbon material or a conductive metal, and preferably includes a carbon material. The anode 110 may also include any suitable additive or binder, including any of the additives or binders used in the cathode 130.

The cathode 130 may be formed by freeze drying the lithium-ion conductive material 132 to form the porous scaffold, and then adding the cathode active material particles 138 to the porous scaffold. For example, the cathode active material particles 138 may be added to the porous scaffold as dry powder or nanoparticles, or the cathode active material particles 138 may be dissolved in a solvent such as ethanol and/or water and then added to the porous scaffold.

A cathode current collector (not shown) may also be placed on top of the porous scaffold of cathode 130, and the anode 110 may also optionally include a current collector (not shown).

Figure 3A:
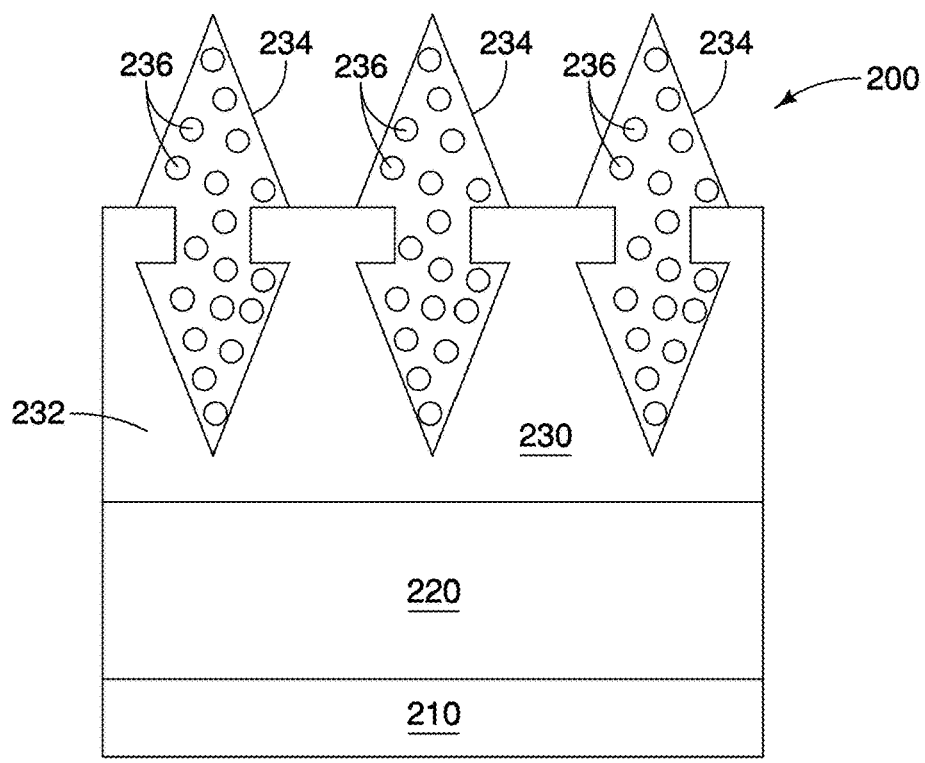
FIG. 3a is a cross-sectional view of a solid electrolyte battery before infiltration of the cathode active material particles according to an embodiment.

FIG. 3a shows a solid-state battery 200 before infiltration of a cathode active material in accordance with a third embodiment. The solid-state battery 200 includes an anode 210, an electrolyte 220, and a cathode 230. As in the first and second embodiments, the solid-state battery 200 can be incorporated in a vehicle, a mobile device, a laptop computer or other suitable personal electronic device.

The anode 210 includes an anode active material. The anode 210 may also include a binder and an additive. The anode active material is any suitable anode active material that is compatible with a solid electrolyte. For example, the anode active material may be lithium metal or a lithium alloy. The anode 210 includes approximately 90-95 percent by weight of the anode active material and five to ten percent by weight of the additive plus the binder. For example, the anode 210 may include approximately 95.0 percent by weight of the anode active material, 2.5 percent by weight of the additive and 2.5 percent by weight of the binder.

The anode 210 may be formed by mixing the anode active material, the additive and the binder with a suitable solvent, such as N-methyl pyrrolidone (NMP). The weight ratio of the solvent to the sum of the anode active material, the additive and the binder may be approximately 2:1.

The electrolyte 220 is a solid electrolyte. The solid electrolyte can be any suitable lithium-ion conductive solid electrolyte. For example, the solid electrolyte can be a sulfide solid electrolyte, an oxide solid electrolyte or a solid polymer electrolyte that includes a polymer having ion transport properties. For example, the solid polymer electrolyte can be a lithium salt dissolved in a conductive polymer matrix such that there is an equimolar amount of the conductive polymer matrix and the lithium salt(s). The lithium salt may be lithium trifluorosulfonylimide (LiTFSI), lithium bis(fluorosulfonyl)imide (LiFSI), lithium hexafluorophosphate (LiPF$_6$), lithium tetrafluoroborate (LiBF$_4$), lithium bis(oxalato)borate (LiBOB), or lithium difluorooxalato borate (LiDFOB). The polymer matrix may be any suitable polymer matrix. For example, the polymer matrix may include a polyalkyleneoxide such as polyethylene oxide (PEO). The polymer matrix may also include a siloxane.

When a sulfide solid electrolyte is used as the electrolyte 220 and the anode 210 includes lithium metal, a protective layer (not shown) may be provided between the electrolyte 220 and the anode 210.

Before infiltration of the cathode active material, the cathode 230 includes a lithium-ion conductive material 232, three-dimensional carbon support structures 234, and voids or holes 236 in the carbon support structures. The lithium-ion conductive material 232 is any suitable lithium-ion conductive material. For example, the lithium-ion conductive material 232 is the same solid electrolyte material as the electrolyte 220. Preferably, the lithium-ion conductive material 232 is a sulfide solid electrolyte or an oxide solid electrolyte.

The three-dimensional carbon support structures 234 are arrow-shaped support structures that are formed of a suitable conductive carbon material and are only partially embedded within the lithium-ion conductive material 232 such that the carbon support structures 234 are not completely covered by the lithium-ion conductive material 232. However, it should be understood that any suitable shape may be used to form the three-dimensional carbon support structures 234. For example, in an alternative embodiment, the three-dimensional carbon support structures 234 may have a dumbbell shape or a diamond shape. The three-dimensional carbon support structures 234 may also have irregular or dissimilar shapes from each other.

Figure 3B:
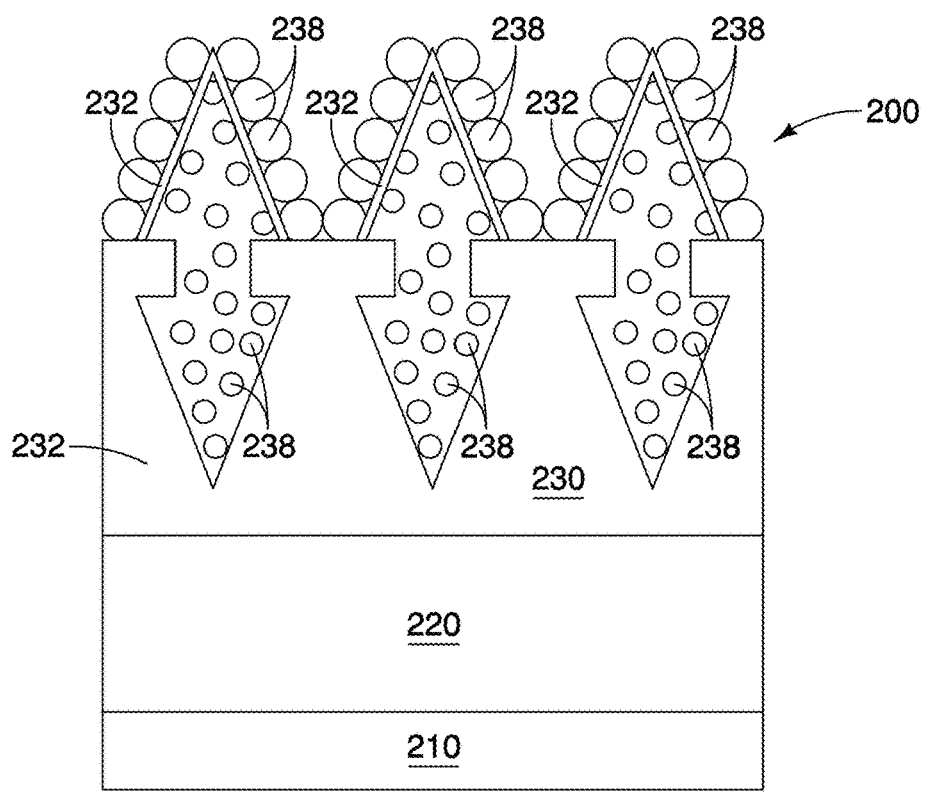
FIG. 3b is a cross-sectional view of the solid electrolyte battery in the embodiment of FIG. 3a after infiltration of cathode active material particles into a lithium-ion conductive material.

Preferably, the three-dimensional carbon support structures 234 each have a shape that is narrower in the middle portion than at portions surrounding the middle portion such that the lithium-ion conductive material 232 mechanically constricts the carbon support structures 234 at the middle portion as shown in FIGS. 3a and 3b.

The three-dimensional carbon support structures 234 are spaced apart at approximately equal distances and are uniformly distributed within the lithium-ion conductive material 232. However, it should be understood that the three-dimensional carbon support structures 234 may be non-uniformly distributed within the lithium-ion conductive material and/or the distances between the three-dimensional carbon support structures 234 may be varied.

Furthermore, although the three-dimensional carbon support structures 234 are shown in FIGS. 3a and 3b as being only partially embedded within the lithium-ion conductive material 232, it should be understood that the three-dimensional carbon support structures 234 may be fully embedded within the lithium-ion conductive material 232 such that the three-dimensional carbon support structures 234 are fully surrounded by the lithium-ion conductive material 232.

The three-dimensional carbon support structures 234 have a length of 5-30 μm. The three-dimensional carbon support structures 234 are also porous and each include holes or voids 236. The three-dimensional carbon support structures 234 may be formed via hydrothermal synthesis or any other suitable method that generates a three-dimensional carbon structure having a length of 5-30 μm and voids 236 of a sufficient size (15 nm to 5 μm) to hold cathode active material particles 238.

FIG. 3b shows the cathode 230 of the third embodiment after infiltration with cathode active material particles 238. The cathode active material particles 238 are any suitable cathode active material particles that can be used in a solid-state battery. For example, the cathode active material particles 238 may be formed of any suitable lithium oxide-based cathode active material. For example, the cathode active material particles may be NMC particles, lithium cobalt oxide particles, lithium phosphate particles, lithium iron phosphate particles or a mixture thereof. The cathode active material particles 238 have a diameter of approximately 15 nm to 5 μm.

After infiltration, the voids 236 are at least partially filled with the cathode active material particles 238, and the cathode active material particles 238 are also provided on the surface of the three-dimensional carbon support structures 234. Furthermore, a thin layer of the lithium-ion conductive material 232 is also provided on the surface of the carbon support structures 234 between the carbon support structures 234 and the cathode active material particles 238. As such, after infiltration, the cathode active material particles 238 are provided both within and on the surface of the carbon support structures 234.

The cathode 230 may also include an additive and/or a binder. The additive and the binder may be included within the three-dimensional carbon support structures 234 or within the lithium-ion conductive material 232. After infiltration, the cathode 230 includes at least 80 percent by weight of the cathode active material particles 238. The cathode also includes 5-15 percent by weight of the lithium-ion conductive material 232, preferably 10-15 percent by weight of the lithium-ion conductive material 232, 2-5 percent by weight of the three-dimensional carbon support structures 234, and up to three percent by weight of the additive plus the binder. For example, the cathode 230 may include approximately two percent by weight of the additive and approximately three percent by weight of the binder. The weight percentage values described above are relative to a total weight of the cathode active material particles 238, the lithium-ion conductive material 232, the three-dimensional carbon support structures 234, the additive and the binder.

The binder may be any suitable electrode binder material. For example, the binder may include polyvinylidene fluoride, styrene-butadiene rubber, a cellulose material or any combination thereof. The additive may be any suitable electrode additive, such as a carbon material or a conductive metal, and preferably includes a carbon material. The anode 210 may also include any suitable additive or binder, including any of the additives or binders used in the cathode 230.

The cathode 230 may be formed by mixing the three-dimensional carbon support structures 234 with the lithium-ion conductive material 232 to form a cathode mixture, and then adding the cathode active material particles 238. For example, the cathode active material particles 238 may be added to the cathode mixture as dry powder or nanoparticles, or the cathode active material particles 238 may be dissolved in a solvent such as ethanol and/or water and then added to the cathode mixture.

The cathode 230 may also include a current collector (not shown) formed on top of the lithium-ion conductive material 232, and the anode 210 may also optionally include a current collector (not shown).

Figure 4A:
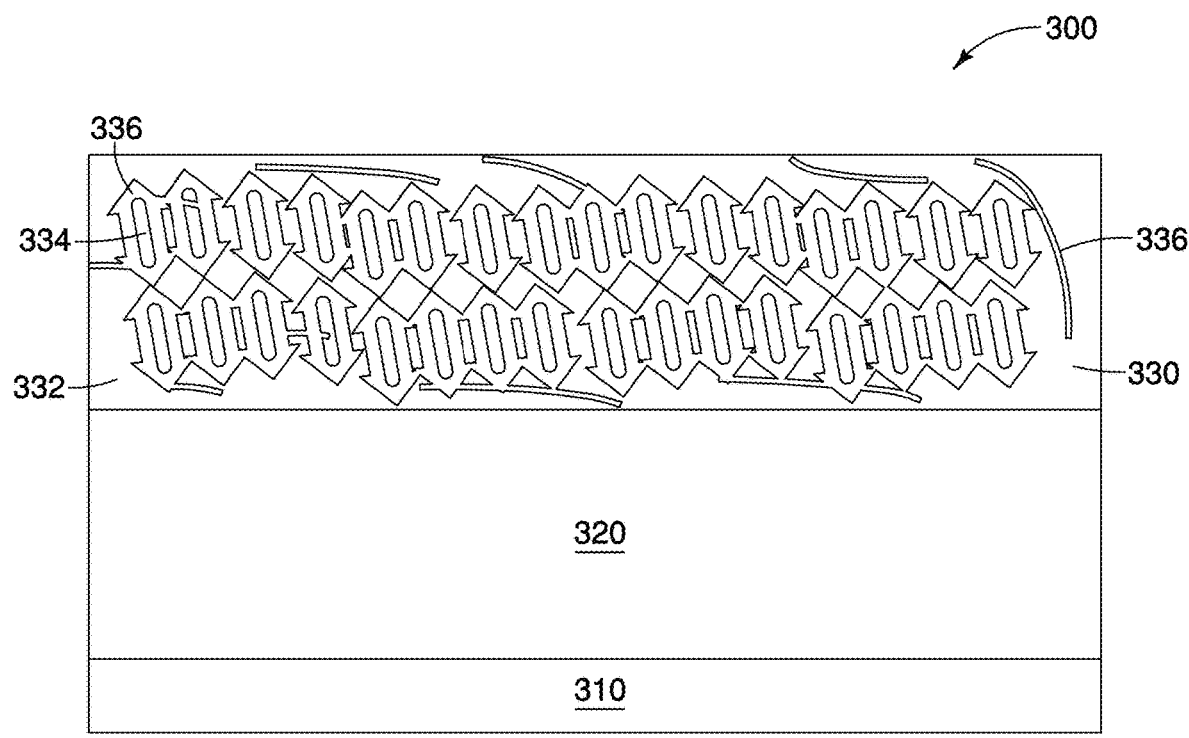
FIG. 4a is a cross-sectional view of a solid electrolyte battery before infiltration of the cathode active material particles according to an embodiment.

FIG. 4a shows a solid-state battery 300 before infiltration of a cathode active material in accordance with a fourth embodiment. The solid-state battery includes an anode 310, an electrolyte 320, and a cathode 330. As in the first, second and third embodiments, the solid-state battery 300 can be incorporated in a vehicle, a mobile device, a laptop computer or other suitable personal electronic device.

The anode 310 includes an anode active material. The anode 310 may also include a binder and an additive. The anode active material is any suitable anode active material that is compatible with a solid electrolyte. For example, the anode active material may be lithium metal or a lithium alloy. The anode 310 includes approximately 90-95 percent by weight of the anode active material and five to ten percent by weight of the additive plus the binder. For example, the anode 310 may include approximately 95.0 percent by weight of the anode active material, 2.5 percent by weight of the additive and 2.5 percent by weight of the binder.

The anode 310 may be formed by mixing the anode active material, the additive and the binder with a suitable solvent, such as N-methyl pyrrolidone (NMP). The weight ratio of the solvent to the sum of the anode active material, the additive and the binder may be approximately 2:1.

The electrolyte 320 is a solid electrolyte. The solid electrolyte can be any suitable lithium-ion conductive solid electrolyte. For example, the solid electrolyte can be a sulfide solid electrolyte, an oxide solid electrolyte or a solid polymer electrolyte that includes a polymer having ion transport properties. For example, the solid polymer electrolyte can be a lithium salt dissolved in a conductive polymer matrix such that there is an equimolar amount of the conductive polymer matrix and the lithium salt(s). The lithium salt may be lithium trifluorosulfonylimide (LiTFSI), lithium bis(fluorosulfonyl)imide (LiFSI), lithium hexafluorophosphate (LiPF$_6$), lithium tetrafluoroborate (LiBF$_4$), lithium bis(oxalato)borate (LiBOB), or lithium difluorooxalato borate (LiDFOB). The polymer matrix may be any suitable polymer matrix. For example, the polymer matrix may include a polyalkyleneoxide such as polyethylene oxide (PEO). The polymer matrix may also include a siloxane.

When a sulfide solid electrolyte is used as the electrolyte 320 and the anode 310 includes lithium metal, a protective layer (not shown) may be provided between the electrolyte 320 and the anode 310.

Before infiltration of the cathode active material, the cathode 330 includes a lithium-ion conductive material 332, three-dimensional carbon support structures 334, and voids or holes 336 in the carbon support structures. In addition, as shown in FIG. 3a, the voids 336 do not have a uniform shape and include channel-like structures in addition to the areas surrounding the center of carbon support structures 334.

The lithium-ion conductive material 332 is any suitable lithium-ion conductive material. For example, the lithium-ion conductive material 332 is the same solid electrolyte material as the electrolyte 320. Preferably, the lithium-ion conductive material 332 is a sulfide solid electrolyte or an oxide solid electrolyte.

The three-dimensional carbon support structures 334 are arrow-shaped support structures that are formed of a suitable conductive carbon material and are fully embedded within the lithium-ion conductive material 332 such that the carbon support structures 334 are completely covered by the lithium-ion conductive material 332. However, it should be understood that any suitable shape may be used to form the carbon support structures 334. For example, in an alternative embodiment, the three-dimensional carbon support structures 334 may have a dumbbell shape or a diamond shape. The three-dimensional carbon support structures 334 may also have irregular or dissimilar shapes from each other.

Figure 4B:
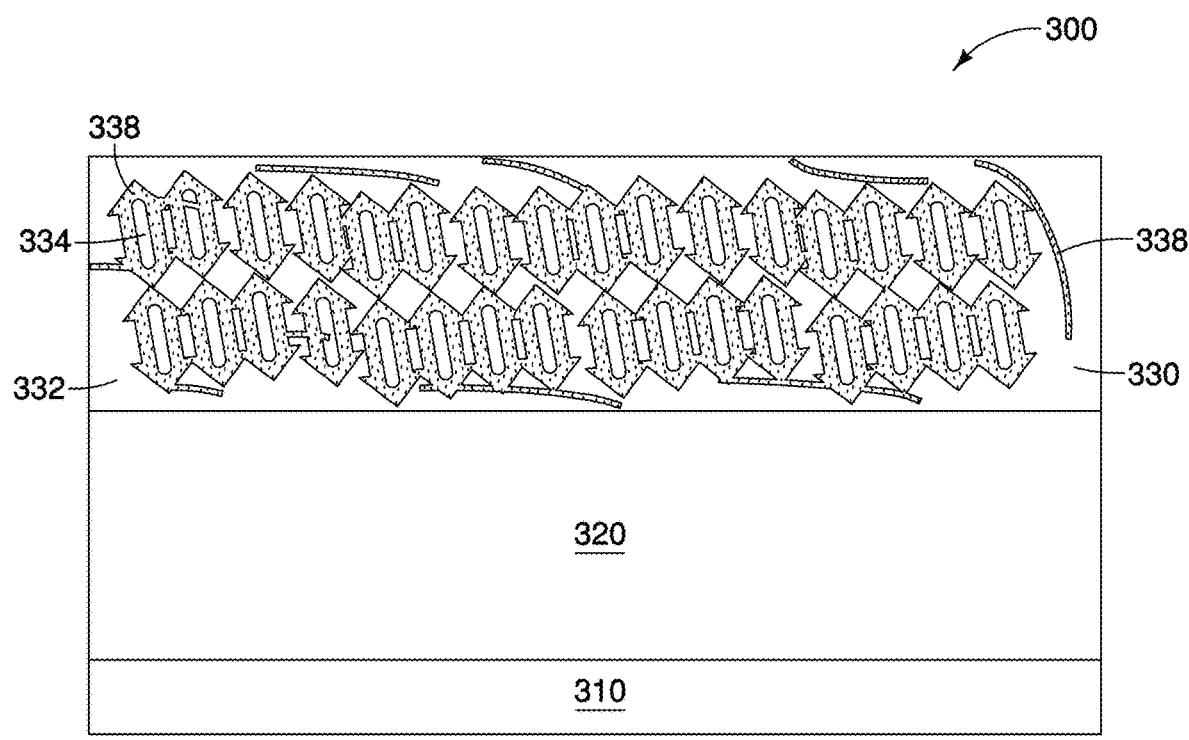
FIG. 4b is a cross-sectional view of the solid electrolyte battery in the embodiment of FIG. 4a after infiltration of cathode active material particles into a lithium-ion conductive material.

Preferably, the three-dimensional carbon support structures 334 each have a shape that is narrower in the middle portion than at portions surrounding the middle portion such that the lithium-ion conductive material 332 mechanically constricts the carbon support structures 334 at the middle portion as shown in FIGS. 4a and 4b.

The three-dimensional carbon support structures 334 are spaced apart at approximately equal distances and are uniformly distributed within the lithium-ion conductive material 332. However, it should be understood that the three-dimensional carbon support structures 334 may be non-uniformly distributed within the lithium-ion conductive material and/or the distances between the three-dimensional carbon support structures 334 may be varied.

Furthermore, although the three-dimensional carbon support structures 334 are shown in FIGS. 4a and 4b as being fully embedded within the lithium-ion conductive material 332, it should be understood that the three-dimensional carbon support structures 334 may be only partially embedded within the lithium-ion conductive material 332 such that the three-dimensional carbon support structures 334 are not completely covered by the lithium-ion conductive material 332.

The three-dimensional carbon support structures 334 have a length of 5-30 μm. The three-dimensional carbon support structures 334 are also porous and each include holes or voids 336. The three-dimensional carbon support structures 334 may be formed via hydrothermal synthesis or any other suitable method that generates a three-dimensional carbon structure having a length of 5-30 μm and voids 336 of a sufficient size (15 nm to 5 μm) to hold cathode active material particles 338.

FIG. 4b shows the cathode 330 after infiltration with cathode active material particles 338. The cathode active material particles 338 are any suitable cathode active material particles that can be used in a solid-state battery. For example, the cathode active material particles 338 may be formed of any suitable lithium oxide-based cathode active material. For example, the cathode active material particles may be NMC particles, lithium cobalt oxide particles, lithium phosphate particles, lithium iron phosphate particles or a mixture thereof. The cathode active material particles 338 have a diameter of approximately 15 nm to 5 μm.

After infiltration, the voids 336 are at least partially filled with the cathode active material particles 338, and the cathode active material particles 338 are also provided on the surface of the three-dimensional carbon support structures 334. As such, after infiltration, the cathode active material particles 338 are provided both within and on the surface of the carbon support structures 334.

The cathode 330 may also include an additive and/or a binder. The additive and the binder may be included within the three-dimensional carbon support structures 334 or within the lithium-ion conductive material 332. After infiltration, the cathode 330 includes at least 80 percent by weight of the cathode active material particles 338. The cathode also includes 5-15 percent by weight of the lithium-ion conductive material 332, preferably 10-15 percent by weight of the lithium-ion conductive material 332, 2-5 percent by weight of the three-dimensional carbon support structures 334, and up to three percent by weight of the additive plus the binder. For example, the cathode 330 may include approximately two percent by weight of the additive and approximately three percent by weight of the binder. The weight percentage values described above are relative to a total weight of the cathode active material particles 338, the lithium-ion conductive material 332, the three-dimensional carbon support structures 334, the additive and the binder.

The binder may be any suitable electrode binder material. For example, the binder may include polyvinylidene fluoride, styrene-butadiene rubber, a cellulose material or any combination thereof. The additive may be any suitable anode additive, such as a carbon material or a conductive metal, and preferably includes a carbon material.

The cathode 330 may be formed by mixing the three-dimensional carbon support structures 334 with the lithium-ion conductive material 332 to form a cathode mixture, and then adding the cathode active material particles 338. For example, the cathode active material particles 338 may be added to the cathode mixture as dry powder or nanoparticles, or the cathode active material particles 338 may be dissolved in a solvent such as ethanol and/or water and then added to the cathode mixture.

The cathode 330 may also include a current collector (not shown) formed on top of the lithium-ion conductive material 332, and the anode 310 may also optionally include a current collector (not shown).

Figure 5:
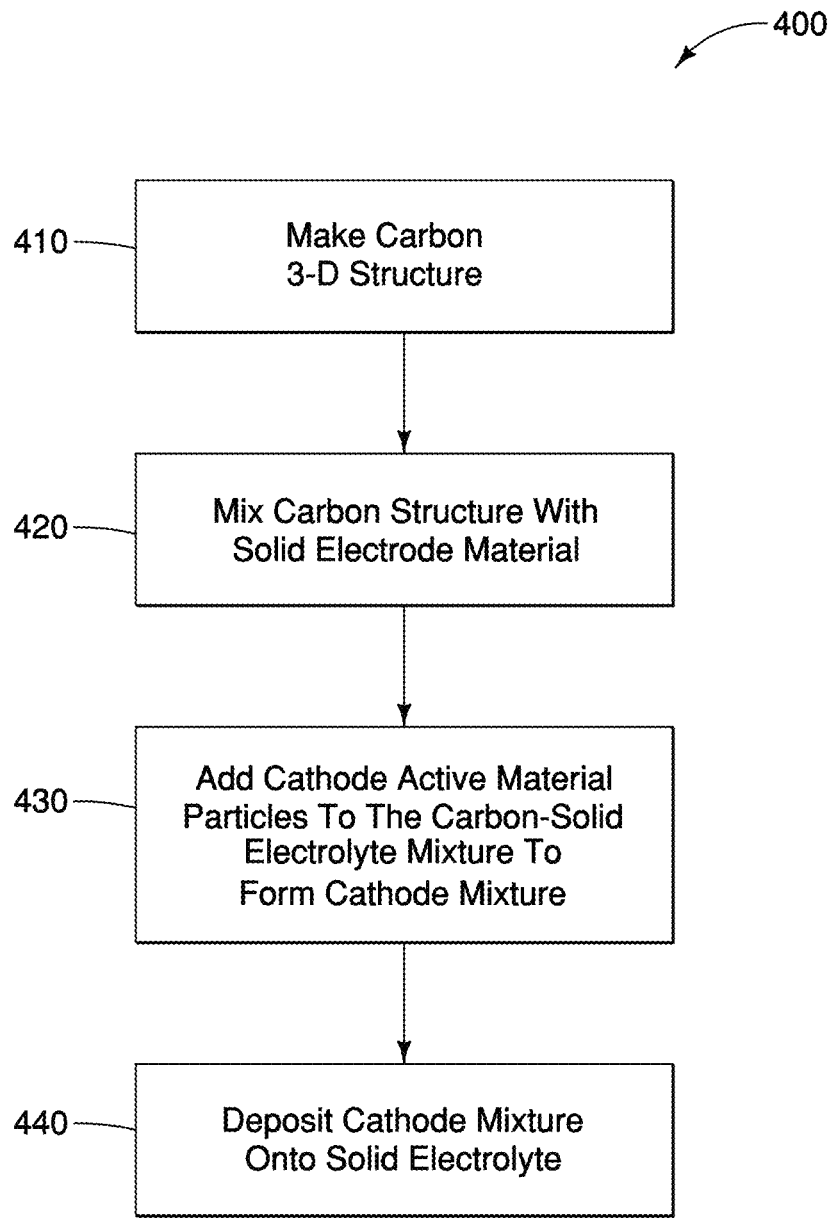
FIG. 5 is an illustrated flow chart showing a method of producing a cathode for a battery including a cathode active material infiltrated into a lithium-ion conductive material according to an embodiment.

FIG. 5 illustrates a process 400 of producing a cathode according to an embodiment. In Step 410, at least one three-dimensional carbon structure is made. The three-dimensional carbon structure can be formed by hydrothermal synthesis or any other suitable method that generates a three-dimensional carbon structure having a length of 5-30 μm and voids of a sufficient size (15 nm to 5 μm) to hold cathode active material particles.

The at least one three-dimensional carbon structure can have any suitable three-dimensional shape that has voids of 15 nm to 5 μm. The shape of the at least one carbon structure can be a dumbbell, an arrow or a diamond-like shape.

In Step 420, the at least one three-dimensional carbon structure is mixed with a lithium-ion conductive material. The lithium-ion conductive material may be any suitable lithium-ion conductive material. For example, the lithium-ion conductive material may be a solid electrolyte material, such as a sulfide solid electrolyte or an oxide solid electrolyte.

In Step 430, cathode active material particles are added to the mixture of the at least one three-dimensional carbon structure and the lithium-ion conductive material to form a cathode mixture. The cathode active material particles may be dry mixed with the at least one three-dimensional carbon structure and the lithium-ion conductive material as a powder, or the cathode active material particles may be dissolved in a solution of ethanol and/or water and then added to the at least one three-dimensional carbon structure and the lithium-ion conductive material.

In Step 440, the cathode mixture is deposited on a solid electrolyte to form a cathode on a solid electrolyte. The solid electrolyte can be any suitable lithium-ion conductive solid electrolyte. For example, the solid electrolyte can be a sulfide solid electrolyte, an oxide solid electrolyte or a solid polymer electrolyte that includes a polymer having ion transport properties.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A cathode comprising:
a lithium-ion conductive material;
at least one carbon support structure at least partially embedded within the lithium-ion conductive material; and
cathode active material particles provided within and on a surface of each of the at least one carbon support structure,
the at least one carbon support structure including voids having a size of 15 nm to 5 μm containing the cathode active material particles.

2. The cathode according to claim 1, further comprising a current collector provided on the lithium-ion conductive material.

3. The cathode according to claim 1, further comprising a binder provided within at least one of the at least one carbon support structure and the lithium-ion conductive material.

4. The cathode according to claim 1, wherein the lithium-ion conductive material is a solid electrolyte material.

5. The cathode according to claim 1, wherein the at least one carbon support structure is a three-dimensional matrix.

6. The cathode according to claim 1, wherein the at least one carbon support structure further includes channels connecting the voids.

7. The cathode according to claim 1, wherein the at least one carbon support structure includes a plurality of carbon support structures that are non-uniformly dispersed within the lithium-ion conductive material.

8. The cathode according to claim 1, wherein the at least one carbon support structure includes a plurality of carbon support structures that are uniformly spaced apart from each other within the lithium-ion conductive material.

9. The cathode according to claim 1, wherein the at least one carbon support structure has a first portion that is narrower than other portions surrounding the first portion such that the lithium-ion conductive material mechanically constricts the at least one carbon support structure.

10. The cathode according to claim 1, wherein the at least one carbon support structure has a length ranging from 5 μm to 30 μm.

11. The cathode according to claim 1, wherein the cathode comprises at least 80% by weight of the cathode active material.

12. The cathode according to claim 1, wherein the cathode comprises 10% by weight to 15% by weight of the lithium-ion conductive material.

13. The cathode according to claim 1, wherein the cathode comprises 2% by weight to 5% by weight of the at least one carbon support structure.

14. The cathode according to claim 1, wherein the lithium-ion conductive material is a solid electrolyte material that includes a sulfide or an oxide.

15. The cathode according to claim 1, wherein the at least one carbon support structure is fully embedded within the lithium-ion conductive material.

16. The cathode according to claim 1, wherein the at least one carbon support structure having a diamond shape, a dumbbell shape or an arrow shape.

17. A battery comprising
a cathode;
an anode; and
a lithium-ion conductive solid electrolyte disposed between the cathode and the anode,
the cathode comprising:
a lithium-ion conductive material;
at least one carbon support structure at least partially embedded within the lithium-ion conductive material; and
cathode active material particles provided within and on a surface of each of the at least one carbon support structure,
the at least one carbon support structure including voids having a size of 15 nm to 5 μm containing the cathode active material particles.

18. The battery according to claim 17, further comprising a binder provided within at least one of the at least one carbon support structure and the lithium-ion conductive material.

19. The battery according to claim 17, wherein the lithium-ion conductive material is the lithium-ion conductive solid electrolyte.

20. The battery according to claim 17, wherein the at least one carbon support structure is a three-dimensional matrix.

21. A cathode comprising:
a lithium-ion conductive material;
at least one carbon support structure at least partially embedded within the lithium-ion conductive material; and
cathode active material particles provided within and on a surface of each of the at least one carbon support structure,
the at least one carbon support structure having a length ranging from 5 μm to 30 μm and including voids having a size of 15 nm to 5 μm.

* * * * *